US012563340B2

(12) United States Patent
Johnson

(10) Patent No.: US 12,563,340 B2
(45) Date of Patent: Feb. 24, 2026

(54) EAR-WEARABLE ELECTRONIC HEARING DEVICE INCORPORATING MICROPHONE ARRAY WITH ENHANCED WIND NOISE SUPPRESSION

(71) Applicant: Starkey Laboratories, Inc., Eden Prairie, MN (US)

(72) Inventor: Andrew Johnson, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 233 days.

(21) Appl. No.: 18/268,884

(22) PCT Filed: Dec. 7, 2021

(86) PCT No.: PCT/US2021/062214
§ 371 (c)(1),
(2) Date: Jun. 21, 2023

(87) PCT Pub. No.: WO2022/146627
PCT Pub. Date: Jul. 7, 2022

(65) Prior Publication Data
US 2024/0298111 A1 Sep. 5, 2024

Related U.S. Application Data

(60) Provisional application No. 63/131,132, filed on Dec. 28, 2020.

(51) Int. Cl.
*H04R 3/00* (2006.01)
*H04R 1/10* (2006.01)
(Continued)

(52) U.S. Cl.
CPC .......... *H04R 3/005* (2013.01); *H04R 1/1041* (2013.01); *H04R 1/1083* (2013.01); *H04R 1/406* (2013.01);
(Continued)

(58) Field of Classification Search
CPC .... H04R 3/005; H04R 1/1041; H04R 1/1083; H04R 1/406; H04R 29/005; H04R 2410/01; H04R 2410/07; H04R 2460/11
(Continued)

(56) References Cited

U.S. PATENT DOCUMENTS 7,813,517 B2 10/2010 Klemenz et al.
9,843,861 B1 12/2017 Termeulen
(Continued)

FOREIGN PATENT DOCUMENTS

EP 2881035 A1 6/2015
GB 2527784 A 1/2016
(Continued)

OTHER PUBLICATIONS

International Patent Application No. PCT/US2021/062214, filed Dec. 7, 2023; International Search Report / Written Opinion issued Mar. 28, 2023; 15 pages.
(Continued)

*Primary Examiner* — William A Jerez Lora
(74) *Attorney, Agent, or Firm* — Mueting Raasch Group

(57) ABSTRACT

An ear-wearable electronic hearing device comprises a housing configured to be worn on, in or about an ear of a wearer, a power source disposed in the housing, and audio processing circuity disposed in the housing and operably coupled to an acoustic transducer. A microphone array comprises a plurality of microphones disposed in or on the housing and operatively coupled to the audio processing circuitry. The microphone array comprises a particular
(Continued)

microphone comprising a mechanical feature that causes the particular microphone to exhibit an acoustic-to-mechanical characteristic that differs from that of other microphones of the microphone array, wherein the different acoustic-to-mechanical characteristic provides for increased wind noise suppression by the particular microphone relative to that achievable by the other microphones.

20 Claims, 5 Drawing Sheets

(51) Int. Cl.
*H04R 1/40* (2006.01)
*H04R 29/00* (2006.01)

(52) U.S. Cl.
CPC ....... *H04R 29/005* (2013.01); *H04R 2410/01* (2013.01); *H04R 2410/07* (2013.01); *H04R 2460/11* (2013.01)

(58) Field of Classification Search
USPC .............................................. 381/56, 58, 312
See application file for complete search history.

(56) References Cited

U.S. PATENT DOCUMENTS

| | | | | |
|---|---|---|---|---|
| 2002/0191802 | A1* | 12/2002 | Choe | H04R 23/00 381/92 |
| 2012/0033831 | A1* | 2/2012 | Leitner | H04R 19/04 381/98 |
| 2016/0073203 | A1* | 3/2016 | Kuriger | H04R 3/005 381/23.1 |
| 2019/0253795 | A1* | 8/2019 | Ozcan | H04R 1/1083 |
| 2021/0233557 | A1* | 7/2021 | Song | G10L 21/0216 |

FOREIGN PATENT DOCUMENTS

| | | | |
|---|---|---|---|
| WO | WO 03/059010 | A1 | 7/2003 |
| WO | WO 2012/025794 | A1 | 3/2012 |

OTHER PUBLICATIONS

Gaggl et al., "Readout circuits for silicon microphones" 2015 International Symposium on VLSI Technology, Systems and Applications, IEEE, Apr. 27, 2015, pp. 1-2.

* cited by examiner

EAR-WEARABLE ELECTRONIC HEARING DEVICE INCORPORATING MICROPHONE ARRAY WITH ENHANCED WIND NOISE SUPPRESSION

RELATED APPLICATIONS

This application is the § 371 U.S. National Stage of International Application No. PCT/US2021/062214, filed Dec. 7, 2021, which claims the benefit of U.S. Provisional Application No. 63/131,132, filed Dec. 28, 2020, the contents of which are hereby incorporated by reference.

TECHNICAL FIELD

This application relates generally to ear-wearable electronic hearing devices and systems, including hearing aids, personal sound amplification devices, earbuds, headphones, bone conduction hearing devices, and other hearables.

BACKGROUND

Wind noise is a common problem for wearers of ear-wearable electronic hearing devices, such as hearing aids, personal sound amplification devices, earbuds, headphones, and other hearables. Wind is impulse energy, random, mostly low-frequency, and extremely loud on microphones of an ear-wearable electronic hearing device. In the music and broadcasting industries, microphones are often protected by a wind screen (e.g. the fuzzy wind screens on boom microphones), but no viable wind screen options exist for ear-wearable electronic hearing devices and hearing aids, as conventional wind screens are too big, too aesthetically unpleasant, or too easily clogged (e.g., by ear wax or airborne particulates) or broken.

SUMMARY

Some embodiments are directed to an ear-wearable electronic hearing device comprising a housing configured to be worn on, in or about an ear of a wearer, a power source disposed in the housing, and audio processing circuitry disposed in the housing and operably coupled to an acoustic transducer. A microphone array comprises a plurality of microphones disposed in or on the housing and operatively coupled to the audio processing circuitry. The microphone array comprises a particular microphone comprising a mechanical feature that causes the particular microphone to exhibit an acoustic-to-mechanical characteristic that differs from that of other microphones of the microphone array, wherein the different acoustic-to-mechanical characteristic provides for increased wind noise suppression by the particular microphone relative to that achievable by the other microphones.

Some embodiments are directed to an ear-wearable electronic hearing device comprising an acoustic port, a power source disposed in the housing, and audio processing circuity disposed in the housing and operably coupled to an acoustic transducer. A microphone array comprises a plurality of microphones disposed in or on the housing and operatively coupled to the audio processing circuitry. The microphone array comprises a particular microphone disposed proximate or in the acoustic port of the housing so as to causes the particular microphone to exhibit an acoustic-to-mechanical characteristic that differs from that of other microphones of the microphone array, wherein the different acoustic-to-mechanical characteristic provides for increased wind noise suppression by the particular microphone relative to that achievable by the other microphones.

Some embodiments are directed to an ear-wearable electronic hearing device comprising a housing configured to be worn on, in or about an ear of a wearer, a power source disposed in the housing, and audio processing circuity disposed in the housing and operably coupled to an acoustic transducer. The audio processing circuity comprises a wind detector and a microphone array comprising a plurality of microphones disposed in or on the housing and operatively coupled to the audio processing circuitry. The microphone array comprises a front microphone and a particular microphone configured or arranged in or on the housing to exhibit an acoustic-to-mechanical characteristic that differs from that of other microphones of the microphone array, the different acoustic-to-mechanical characteristic providing for increased wind noise suppression by the particular microphone relative to that achievable by the other microphones. The microphone array is configured to operate in a directional mode using at least the front microphone and the particular microphone, and switch from the directional mode to a wind noise suppression mode using the particular microphone but not the front microphone in response to the wind detector detecting wind noise.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
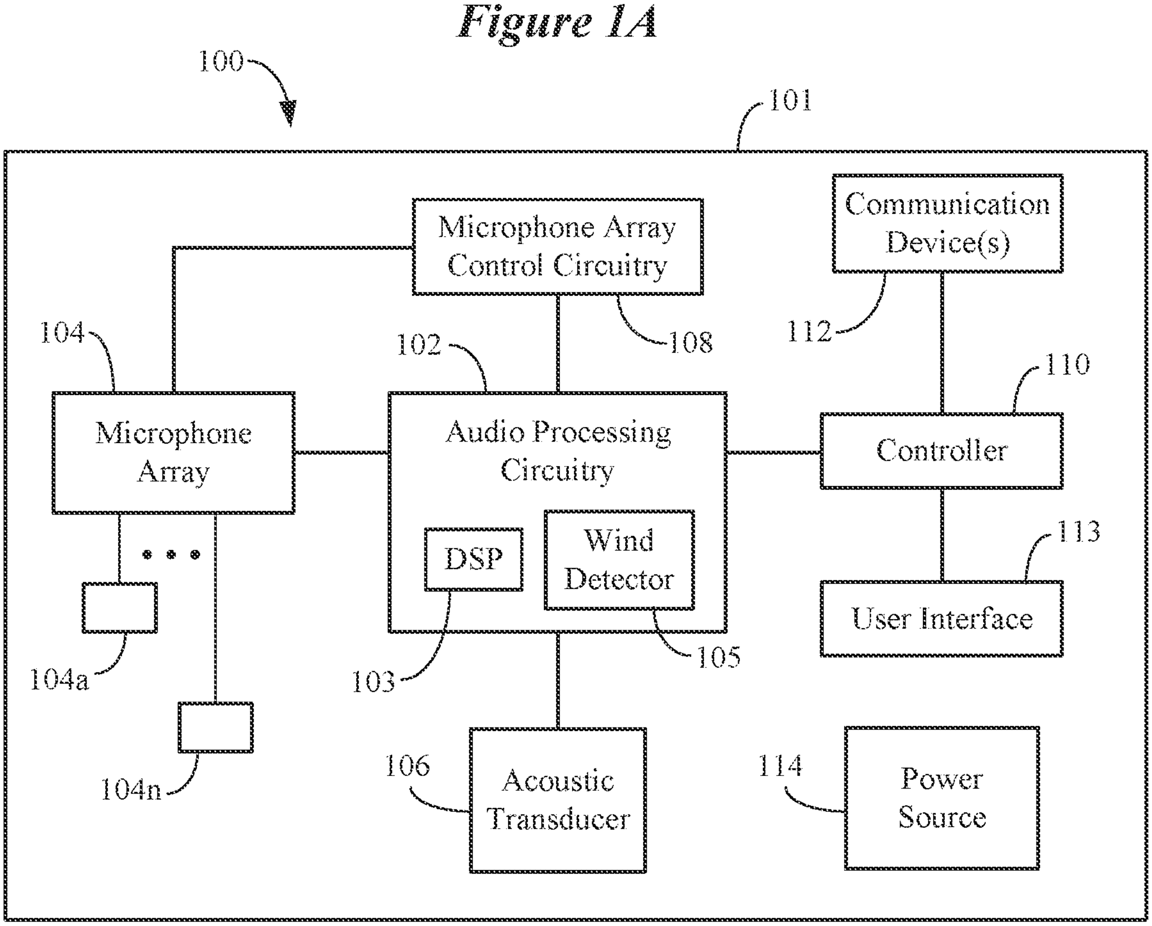
FIG. 1A is a block diagram of the ear-wearable electronic hearing device which incorporates a microphone array and control electronics configured to provide for enhanced wind noise suppression in accordance with any of the embodiments disclosed herein.

It is understood that the embodiments described herein may be used with any ear-wearable electronic hearing device or system without departing from the scope of this disclosure. The devices and systems depicted in the figures are intended to demonstrate the subject matter, but not in a limited, exhaustive, or exclusive sense. It is also understood that the present subject matter can be used with an ear-wearable electronic hearing device or system designed for use in or on the right ear, in or on the left ear, or in or on both ears of a wearer.

The term ear-wearable electronic hearing device refers to a wide variety of electronic hearing devices configured for deployment in, on or about an ear of a wearer. The term ear-wearable electronic hearing device refers to a wide variety of electronic apparatuses that can aid a person with impaired hearing. The term ear-wearable electronic hearing device also refers to a wide variety of electronic apparatuses that can produce amplified, optimized, and/or processed sound for persons with normal hearing. Representative ear-wearable electronic hearing devices of the present disclosure include, but are not limited to, on-the-ear (OTE), over-the-ear (OVTE), near-the-ear (NTE), in-the-ear (ITE), in-the-canal (ITC), completely-in-the-canal (CIC), invisible-in-canal (IIC), receiver-in-canal (RIC), behind-the-ear (BTE), and receiver-in-the-ear (RITE) type devices (or a combination of any of these devices).

Ear-wearable electronic hearing devices of the present disclosure include consumer electronic devices, such as consumer earbuds, consumer sound amplifiers, electronic ear plugs, earphones, headphones, virtual reality headsets, consumer hearing assistance devices (e.g., consumer hearing aids and over-the-counter (OTC) hearing devices), and other ear-wearable electronic appliances. Ear-wearable electronic hearing devices of the present disclosure include restricted medical devices (e.g., devices regulated by the U.S. Food and Drug Administration), such as hearing aids (e.g., hearing instruments), cochlear implants, and bone-conduction devices, for example.

Ear-wearable electronic hearing devices typically include an enclosure, such as a housing or shell, within which internal components are disposed. Typical components of the ear-wearable electronic hearing device can include a digital signal processor (DSP), memory, power management circuitry (e.g., including a rechargeable power source and charging circuitry), one or more communication devices (e.g., a Bluetooth® transceiver or other type of radio frequency (RF) transceiver and/or a near-field communication (NFC) transceiver such as a near-field magnetic induction or NFMI transceiver), one or more antennas (e.g., RF and/or magnetic antennas), two or more microphones (e.g., a microphone array), and an acoustic transducer (e.g., a receiver or speaker), for example.

Many ear-wearable electronic hearing devices include two omnidirectional microphones (e.g., a front omnidirectional microphone and a rear omnidirectional microphone) to enhance audibility in different environments. For example, in quiet environments, the front microphone is typically used in a front omnidirectional mode and the rear microphone is not used. In loud environments, the microphone array is switched such that the front and rear microphones operate in a dual-omni directional mode. It is well known that the front and rear microphones must have matching sensitivity for dual-omni directionality to work properly using conventional techniques. If wind is detected while operating in the dual-omni directional mode, the microphone array is switched back to the front omnidirectional mode in which case the front microphone, but not the rear microphone, is used.

When the front and rear microphones operate in a directional mode, these microphones have a noise floor (referred to herein as "self-noise") which is high especially in low frequencies. To address this self-noise issue, the lowest channel (e.g., <400 Hz) is typically left in the omnidirectional mode. Wind noise is mostly low in frequency, but can be so loud that it drowns out usable higher frequency signals. Any attempt to electrically or digitally filter low-frequency wind noise is futile, since the signal coming out of the microphone is already corrupted by wind noise.

A number of techniques have been developed for ear-wearable electronic hearing devices that incorporate an array of microphones in an attempt to reduce wind noise. One technique involves attempting to digitally filter out low frequency content of a microphone signal—the louder the wind noise, the higher the filter cutoff frequency. Any attempt to digitally filter the microphone signal might reduce the low end of the wind noise, but by this point the good (e.g., desired) microphone signal content is already distorted. The microphone is physically saturated by the wind noise and, thus, less sensitive to the good signals. Another technique involves digitally reducing microphone gain when wind is detected. Reducing microphone gain makes the listening situation more comfortable for the listener, but it does nothing to preserve the good signal he or she is trying to hear.

A further approach to dealing with wind noise involves designing a microphone cover to reduce wind noise prior to impinging on the diaphragm. Covers for conventional microphones used by musicians and broadcasters attempt to disrupt turbulence of wind, but these are not very effective. The designs that are effective are not practical for an ear-wearable electronic hearing device (e.g., the fuzzy wind screens on boom microphones). Moreover, there are many situations where wind energy gets into the microphones and obliterates all other signals, notwithstanding the presence of a microphone cover.

Another approach involves choosing a microphone location on the device housing to reduce wind noise. Placing the microphones at an in-the-ear location when the device housing is deployed in the ear rather than behind the ear can be effective (e.g., the pinna shields much of the wind), but it is not always an option (e.g., behind-the-ear devices). As with microphone port designs, there are many situations where wind gets into the microphone location.

Yet another technique involves use of a noise cancellation algorithm applied to the signal produced by the front and rear microphones. Noise cancellation algorithms are effective when one microphone has much less wind noise than another. If both front and rear are microphones are impacted by wind noise, a noise cancellation solution is no more effective than the two preceding solutions.

Another technique involves streaming audio from the less noisy ear device to the other ear device. This technique works well because one ear is usually better shielded from wind. However, this approach reduces binaural cues, requires extra power for ear-to-ear communication, requires a binaural pair, and there will still be times when both ears are subject to wind noise at the same time.

Embodiments of the present disclosure are directed to ear-wearable electronic hearing devices which incorporate a microphone array configured to enhance audibility in the presence of wind noise. Ear-wearable electronic hearing devices of the present disclosure can incorporate a microphone array comprising plurality of microphones, a particular one of which comprises a mechanical feature that causes the particular microphone to exhibit an acoustic-to-mechanical characteristic that differs from that of other microphones of the microphone array. The different acoustic-to-mechanical characteristic provides for increased wind noise suppression by the particular microphone relative to that achievable by the other microphones. For example, the particular microphone can have a low frequency sensitivity which is unmatched to low frequency sensitivities of the other microphones, such that the mismatch in microphone sensitivity enhances audibility in the presence of wind noise.

For example, and according to any of the embodiments disclosed herein, a microphone array of an ear-wearable electronic hearing device can include at least a front microphone and a rear microphone. The rear microphone (or another microphone other than the front microphone) can be a microphone which is mechanically different from the other microphones of the array, such that the rear microphone is less sensitive to low frequencies relative to the other microphones (e.g., sensitivity unmatched at low frequencies, but matched at high frequencies relative to a specified corner frequency). For example, the rear microphone can include a barometric relief hole or vent which is larger than that of the other microphones. The mechanically modified rear microphone provides better wind noise suppression than any algorithm can provide.

When wind noise is detected, the microphone array can be switched to the rear microphone which operates in an omnidirectional mode and the front microphone is not used. Normal omnidirectional operation in quiet environments is unaffected, since this mode uses the front microphone only. Normal directional operation is also unaffected, since the front omnidirectional microphone signal is used for low frequencies, and the front and rear microphone sensitivities will still be matched above a specified corner frequency (e.g., 400 Hz).

Ear-wearable electronic hearing devices of the present disclosure can incorporate a microphone array comprising a plurality of microphones, a particular one of which is arranged in or on the housing so as to causes the particular microphone to exhibit an acoustic-to-mechanical characteristic that differs from that of other microphones of the microphone array. The different acoustic-to-mechanical characteristic provides for increased wind noise suppression by the particular microphone relative to that achievable by the other microphones. The housing of the device can comprise a structure configured to serve as a mechanical frequency-based filter and/or a shroud structure configured to reduce wind noise at the particular microphone. The particular microphone can have a sensitivity that is matched or unmatched with respect to the other microphone or microphones of the microphone array.

Ear-wearable electronic hearing devices of the present disclosure can incorporate a microphone array comprising a plurality of microphones and electronic circuitry including a wind detector. The microphone array can comprise a front microphone and a particular microphone configured or arranged in or on the housing to exhibit an acoustic-to-mechanical characteristic that differs from that of other microphones of the microphone array. The different acoustic-to-mechanical characteristic provides for increased wind noise suppression by the particular microphone relative to that achievable by the other microphones. The microphone array can be configured to operate in a directional mode using at least the front microphone and the particular microphone, and switch from the directional mode to a wind noise suppression mode using the particular microphone, but not the front microphone, in response to the wind detector detecting wind noise having a magnitude that exceeds a threshold. The microphones can be sensitivity matched microphones, sensitivity unmatched microphones, or a combination of sensitivity matched microphones and at least one sensitivity unmatched microphone.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. An ear-wearable electronic hearing device comprises a housing configured to be worn on, in or about an ear of a wearer, a power source disposed in the housing, and audio processing circuity disposed in the housing and operably coupled to an acoustic transducer. A microphone array comprises a plurality of microphones disposed in or on the housing and operatively coupled to the audio processing circuitry. The microphone array comprises a particular microphone comprising a mechanical feature that causes the particular microphone to exhibit an acoustic-to-mechanical characteristic that differs from that of other microphones of the microphone array, wherein the different acoustic-to-mechanical characteristic provides for increased wind noise suppression by the particular microphone relative to that achievable by the other microphones.

Example Ex2. An ear-wearable electronic hearing device comprises a housing configured to be worn on, in or about an ear of a wearer and comprising an acoustic port, a power source disposed in the housing, and audio processing circuity disposed in the housing and operably coupled to an acoustic transducer. A microphone array comprises a plurality of microphones disposed in or on the housing and operatively coupled to the audio processing circuitry. The microphone array comprises a particular microphone disposed proximate or in the acoustic port of the housing so as to causes the particular microphone to exhibit an acoustic-to-mechanical characteristic that differs from that of other microphones of the microphone array, wherein the different acoustic-to-mechanical characteristic provides for increased wind noise suppression by the particular microphone relative to that achievable by the other microphones.

Example Ex3. An ear-wearable electronic hearing device comprises a housing configured to be worn on, in or about an ear of a wearer, a power source disposed in the housing, and audio processing circuity disposed in the housing and operably coupled to an acoustic transducer. The audio processing circuity comprises a wind detector and a microphone array comprising a plurality of microphones disposed in or on the housing and operatively coupled to the audio processing circuitry. The microphone array comprises a front microphone and a particular microphone configured or arranged in or on the housing to exhibit an acoustic-to-mechanical characteristic that differs from that of other microphones of the microphone array, the different acoustic-to-mechanical characteristic providing for increased wind noise suppression by the particular microphone relative to that achievable by the other microphones. The microphone array is configured to operate in a directional mode using at least the front microphone and the particular microphone, and switch from the directional mode to a wind noise suppression mode using the particular microphone but not the front microphone in response to the wind detector detecting wind noise.

Example Ex4. The device according to one or more of Ex1 to Ex3, wherein the particular microphone has a low frequency sensitivity which is unmatched to low frequency sensitivities of the other microphones.

Example Ex5. The device according to one or more of Ex1 to Ex4, wherein the particular microphone has a low frequency sensitivity which is unmatched to low frequency sensitivities of the other microphones below about 600 Hz.

Example Ex6. The device according to one or more of Ex1 to Ex5, wherein the different acoustic-to-mechanical characteristic causes the particular microphone to have a low frequency sensitivity that differs from that of the other microphones.

Example Ex7. The device according to one or more of Ex1 to Ex6, wherein the different acoustic-to-mechanical characteristic causes the particular microphone to have a low frequency sensitivity which is lower than that of the other microphones.

Example Ex8. The device according to one or both of Ex2 and Ex3, wherein the particular microphone has a sensitivity which is matched to sensitivities of the other microphones.

Example Ex9. The device of according to Ex1, wherein the mechanical feature defines an element of a high-pass mechanical filter of the particular microphone, the high-pass mechanical filter having a specified corner frequency.

Example Ex10. The device according to Ex9, wherein the mechanical feature of the particular microphone comprises a barometric relief vent having a size which is larger than that of respective barometric relief vents of the other microphones.

Example Ex11. The device according to Ex10, wherein the barometric relief vent of the other microphones has a size of about 1 to 4 μm, and the barometric relief vent of the particular microphone has a size larger than 4 μm.

Example Ex12. The device according to Ex10, wherein the barometric relief vent of the other microphones has a size of about 1 to 4 μm, and the barometric relief vent of the particular microphone has a size of about 6 to 100 μm.

Example Ex13. The device according to one or more of Ex9 to Ex12, wherein the mechanical feature of the particular microphone comprises a diaphragm which differs from that of the other microphones in terms of one or more of size, thickness, and material.

Example Ex14. The device according to Ex2, wherein the acoustic port is configured to fluidically couple the particular microphone to an acoustic environment external of the housing, and the acoustic port is configured as a high-pass mechanical filter for the particular microphone having a specified corner frequency.

Example Ex15. The device according to Ex14, wherein the housing comprises a shroud structure proximate the acoustic port and configured to reduce wind noise at the particular microphone.

Example Ex16. The device according to one or more of Ex9 to Ex15, wherein the high-pass mechanical filter is a first order high-pass mechanical filter.

Example Ex17. The device according to one or more of Ex9 to Ex16, wherein the specified corner frequency is no higher than a frequency from about 500 Hz to about 700 Hz.

Example Ex18. The device according to one or more of Ex9 to Ex17, wherein the specified corner frequency is no higher than about 600 Hz.

Example Ex19. The device according to one or more of Ex1 to Ex18, wherein each of the microphones is configured as an omnidirectional microphone.

Example Ex20. The device according to one or more of Ex1 to Ex18, wherein at least the particular microphone is configured as an omnidirectional microphone.

Example Ex21. The device according to one or more of Ex1 to Ex18, wherein each of the microphones is configured as a directional microphone.

Example Ex22. The device according to one or more of Ex1 to Ex18, wherein at least the particular microphone is configured as a directional microphone.

Example Ex23. The device according to one or more of Ex1 to Ex18, wherein at least the particular microphone is configured as a gradient/dipole microphone.

Example Ex24. The device according to one or more of Ex1 to Ex18, wherein each of the microphones is configured as gradient/dipole microphones.

Example Ex25. The device according to one or more of Ex1 to Ex18, wherein the plurality of microphones comprises at least one omnidirectional microphone and at least one directional or gradient/dipole microphone.

Example Ex26. The device according to one or more of Ex1 to Ex25, wherein the microphone array is configured as a beamforming microphone array.

Example Ex27. The device according to one or more of Ex1 to Ex26, wherein the microphone array is configured as a steerable beamforming microphone array.

Example Ex28. The device according to one or more of Ex1 to Ex27, wherein the microphone array comprises a front microphone, and the particular microphone is a microphone of the microphone array other than the front microphone.

Example Ex29. The device according to one or more of Ex1 to Ex27, wherein, the microphone array comprises a front microphone and a rear microphone, and the particular microphone is configured as the rear microphone.

Example Ex30. The device according to one or more of Ex1 to Ex27, wherein the microphone array comprises a front microphone, a middle microphone, and a rear microphone, and the particular microphone is configured as the middle microphone.

Example Ex31. The device according to one or more of Ex1 to Ex27, wherein the microphone array comprises a front microphone, a rear microphone, and a plurality of additional microphones positioned between the front and rear microphones, and the particular microphone is configured as one of the additional microphones.

Example Ex32. The device according to one or more of Ex1 to Ex27, wherein the microphone array comprises a front microphone, a first particular microphone is configured to exhibit a first acoustic-to-mechanical characteristic providing for a first level of wind noise suppression, and a second particular microphone is configured to exhibit a second acoustic-to-mechanical characteristic providing for a second level of wind noise suppression different from the first level of wind noise suppression.

Example Ex33. The device according to one or more of Ex1 to Ex27, wherein the microphone array comprises only a front microphone and a rear microphone, the particular microphone is configured as the rear microphone, and the microphone array is configured to operate in a directional mode using the front microphone and the rear microphone, and switch from the directional mode to a wind noise suppression mode using only the rear microphone.

Example Ex34. The device according to one or more of Ex1 to Ex27, wherein the microphone array comprises a front microphone, a rear microphone, and one or more additional microphones disposed between the front and rear microphones, and the microphone array is configured to operate in a directional mode using the front microphone and any one or any combination of the rear microphone and the one or more additional microphones, and switch from the directional mode to a wind noise suppression mode using a microphone selected from any of the rear microphone and the one or more additional microphones, wherein the selected microphone is configured as the particular microphone.

Example Ex35. The device according to Ex3, wherein the particular microphone comprising a mechanical feature that causes the particular microphone to exhibit an acoustic-to-mechanical characteristic that differs from that of other microphones of the microphone array, or the housing comprises an acoustic port, and the particular microphone is disposed proximate or in the acoustic port of the housing so as to causes the particular microphone to exhibit an acoustic-to-mechanical characteristic that differs from that of other microphones of the microphone array.

Example Ex36. The device according to Ex3, wherein the particular microphone comprising a mechanical feature that causes the particular microphone to exhibit an acoustic-to-mechanical characteristic that differs from that of other microphones of the microphone array, and the housing comprises an acoustic port, and the particular microphone is disposed proximate or in the acoustic port of the housing so as to causes the particular microphone to exhibit an acoustic-to-mechanical characteristic that differs from that of other microphones of the microphone array.

Figure 1B:
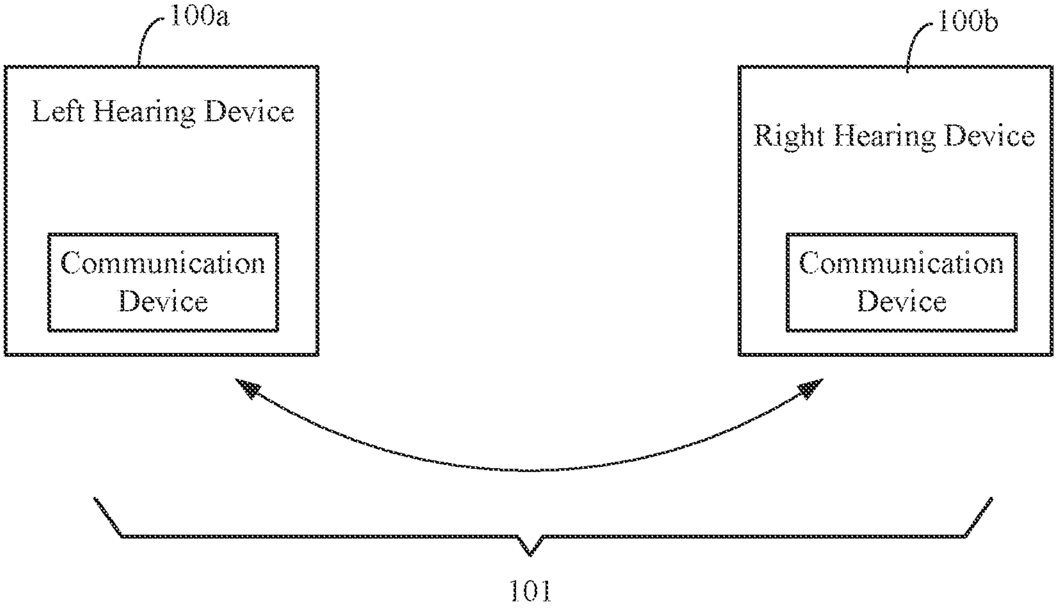
FIG. 1B illustrates a hearing system comprising two hearing devices shown in FIG. 1A.

FIG. 1A is a block diagram of the ear-wearable electronic hearing device which incorporates a microphone array and control electronics configured to provide for enhanced wind noise suppression in accordance with any of the embodiments disclosed herein. The device 100 shown in FIG. 1A represents a single ear-wearable electronic hearing device (e.g., a monaural or single-ear device). FIG. 1B illustrates a hearing system 101 comprising two hearing devices 100 (e.g., a binaural or dual-ear devices) shown in FIG. 1A. The hearing system 101 includes a left hearing device 100*a* and a right hearing device 100*b*. The left and right hearing devices 100*a*, 100*b* can have the same components as shown in FIG. 1A or can differ in terms of some components and/or some functionality. Each of the left and right hearing devices 100*a*, 100*b* incorporates a microphone array and an enhanced wind noise suppression mechanism in accordance with any of the embodiments disclosed herein.

The ear-wearable electronic hearing device 100 includes a housing 101 configured for deployment in, on or about an ear of a wearer. According to any of the embodiments disclosed herein, the housing 101 can be configured for deployment at least partially within the wearer's ear. For example, the housing 101 can be configured for deployment at least partially or entirely within an ear canal of the wearer's ear. In some configurations, the shape of the housing 101 can be customized for the wearer's ear canal (e.g., based on a mold taken from the wearer's ear canal). In other configurations, the housing 101 can be constructed from, or at least comprise, pliant (e.g., semisoft) material that, when inserted into the wearer's ear canal, takes on the shape of the ear canal.

According to any of the embodiments disclosed herein, the housing 101 can be configured for deployment at least partially within the outer ear, such as from the helix to the ear canal (e.g., the concha cymba, concha cavum) and can extend up to or into the ear canal. According to any of the embodiments disclosed herein, the housing 101 can be configured for deployment at or on the wearer's outer ear, such as behind the wearer's ear or situated on or over (but in contact with) the wearer's ear without extending into the wearer's ear or ear canal.

The housing 101 is configured to contain or support a number of components including audio processing circuitry 102 operatively coupled to a microphone array 104 and an acoustic transducer 106, such as a speaker or a receiver. The microphone array 104 includes two or more microphones 104*a*-104*n* (e.g., 2, 3, 4, 5, or 6 microphones). In some embodiments, some or all of the microphones 104*a*-104*n* of the microphone array 104 are sensitivity mismatched. In other embodiments, some or all of the microphones 104*a*-104*n* are sensitivity matched. In further embodiments, the microphone array 104 includes a mix of sensitivity mismatched and sensitivity matched microphones 104*a*-104*n*.

Microphone array control circuitry 108 is coupled to the microphone array 104 and to the audio processing circuitry 102. Although not shown, the microphone array control circuitry 108 can also be coupled to a controller 110 of the hearing device 100. The microphone array control circuitry 108 is configured to control operation of the microphone array 104, such as by operating the array 104 in different modes (e.g., directional mode, omnidirectional mode, wind noise suppression mode, etc.). It is noted that the microphone array control circuitry 108 can be integral to the audio processing circuitry 102 or to the controller 110.

The audio processing circuitry 102 includes a processor 103, such as a digital signal processor (DSP), which includes or is coupled to memory. The audio processing circuitry 102 also includes a wind detector 105, which typically comprises a wind detection algorithm (e.g., processor executable instructions or code) executed by the DSP 103 or other processor. The wind detector 105 is configured to detect the presence of wind noise that negatively impacts performance of the microphone array 104. The microphone array control circuitry 108 can adjust the operation of the microphone array 104 (e.g., switching the mode of operation, activating/deactivating particular microphones, changing microphone directional sensitivity, beamformer steering) in response to detecting the presence of wind noise by the wind detector 105.

In some implementations, the processor 103 is coupled to the audio processing circuitry 102 rather than being an integral component. It is understood that electronic circuitry of the ear-wearable electronic hearing device 100 can include one or more processors, controllers, DSPs, and/or other logic devices. For example, the audio processing circuitry 102 can include, or be operably coupled to, one or more processors 103 or other logic devices. The audio processing circuitry 102 can incorporate or be coupled to various analog components (e.g., analog front-end), ADC and DAC components, and Filters (e.g., FIR filter, Kalman filter). The audio processing circuitry 102 can include, or be operatively coupled to, one or more types of memory, including ROM, RAM, SDRAM, NVRAM, EEPROM, and FLASH, for example.

The controller 110 is coupled to the audio processing circuitry 102, a user interface 113, and a communication device or devices 112. The controller 110 is configured to execute computer/processor readable instructions or code to coordinate operations of the hearing device 100. The controller 110 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 110 can include, or be operatively coupled to, one or more types of memory, including any of those listed above.

The user interface 113 is configured to receive an input from the wearer of the ear-wearable electronic hearing device 100. The input from the wearer can be a touch input, a gesture input, or a voice input, for example. The user interface 110 can include one or more of a tactile interface, a gesture interface, and a voice command interface. The tactile interface can include one or more manually actuatable switches (e.g., a push button, a toggle switch, a capacitive switch).

Figure 1C:
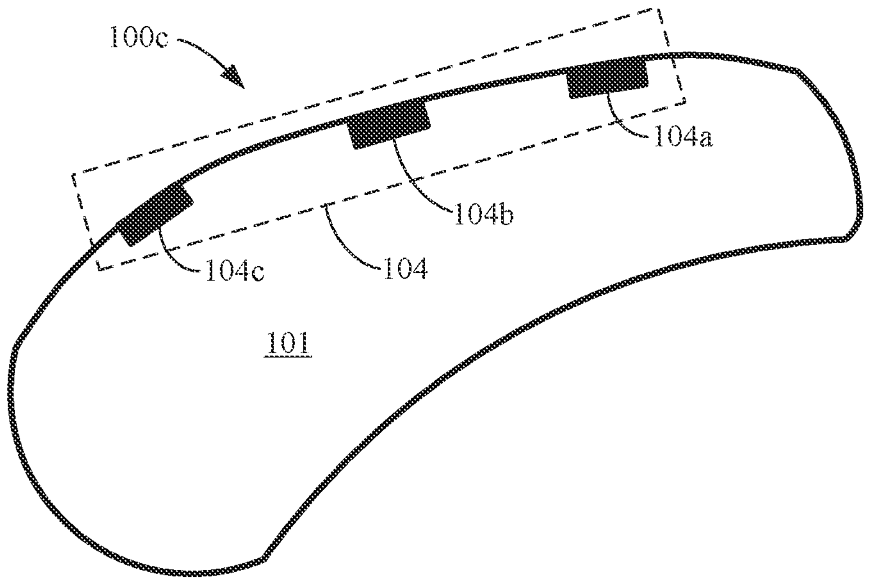
FIG. 1C illustrates an ear-wearable electronic hearing device which incorporates a microphone array and control electronics configured to provide for enhanced wind noise suppression in accordance with any of the embodiments disclosed herein.
Figure 1D:
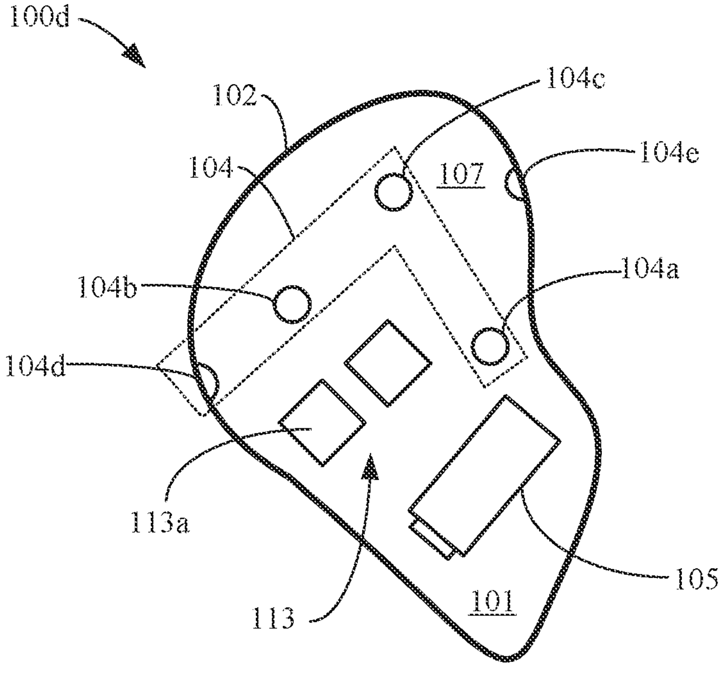
FIG. 1D illustrates an ear-wearable electronic hearing device which incorporates a microphone array and control electronics configured to provide for enhanced wind noise suppression in accordance with any of the embodiments disclosed herein.

The hearing device 100 can include one or more communication devices 112, such as a Bluetooth® transceiver or other type of radio frequency (RF) transceiver and/or a near-field communication (NFC) transceiver such as a near-field magnetic induction (NFMI) transceiver. The one or more communication devices 112 can include, or be operatively coupled to, one or more antennas (e.g., RF and/or magnetic antennas). A power source 114 is disposed in the housing 101 and operatively coupled to provide power to power-consuming components of the hearing device 100. The power source 114 can include a rechargeable power source (e.g., lithium-ion battery) and be coupled to (or include) power management circuitry (e.g., charging circuitry). FIGS. 1C and 1D illustrate ear-wearable electronic hearing devices which incorporate a microphone array and control electronics configured to provide for enhanced wind noise suppression in accordance with any of the embodiments disclosed herein. The hearing device 100*c* shown in FIG. 1C represents any type of behind-the-ear, on-the-ear, over-the-ear or near-the-ear device (e.g., BTE, RIC or RITE device). The hearing device 100*d* shown in FIG. 1D represents any type of in-the-ear device, such as an in-the-canal, completely-in-the-canal or invisible-in-canal device (e.g., ITE, ITC, CIC or IIC device). The hearing device 100*d* may be a custom hearing device having a housing 101 customized for a specific wearer. The hearing device 100*c*, 100*d* can include any or all of the components shown in FIG. 1A and in FIG. 5. The hearing device 100*c*, 100*d* includes a microphone array 104 disposed in or on the housing 101. The microphone array 104 includes a plurality of microphones 104*a*-104*n*.

The hearing device 100*c* shown in FIG. 1C includes three microphones 104*a*-104*c* for purposes of illustration. The hearing device 100*d* (e.g., an ITE device) shown in FIG. 1D includes five microphones 104*a*-104*e* for purposes of illustration. As shown, an exposed surface 107 of the housing 101 includes three microphones 104*a*, 104*b*, 104*c*, a user interface 113 comprising a switch arrangement 113*a*, and a battery drawer cover 105. The microphones 104*a*, 104*b*, 104*c* can be omnidirectional or directional microphones or a combination thereof. Some or all of the microphones 104*a*, 104*b*, 104*c* can define a directional microphone array 104. In some configurations, the three microphones 104*a*, 104*b*, 104*c* can be positioned on different vertical planes of the exposed surface 107 which can provide for improved directivity in the vertical plane.

It is understood that the microphone array 104 shown in FIGS. 1C and 1D includes at least two microphones. In the representative embodiment shown in FIG. 1C, microphone 104*a* can be considered a front microphone, microphone 104*c* can be considered a rear microphone, and microphone 104*b* can be considered a middle microphone for purposes of discussion. In the representative embodiment shown in FIG. 1D, one of microphone 104*d* and 104*e* can be considered a front microphone, the other of microphone 104*d* and 104*e* can be considered a middle microphone, and microphone 104*a*, 104*b* or 104*c* can be considered a rear microphone for purposes of discussion.

According to any of the embodiments disclosed herein, a particular microphone (e.g., microphone 104*c* of FIG. 1C, microphone 104*c* of FIG. 1D) of the microphone array 104 includes a mechanical feature that causes the particular microphone to exhibit an acoustic-to-mechanical characteristic that differs from that of other microphones of the microphone array 104. Advantageously, the different acoustic-to-mechanical characteristic provides for increased wind noise suppression by the particular microphone relative to that achievable by the other microphones of the microphone array 104. The particular microphone that exhibits a different acoustic-to-mechanical characteristic relative to other microphones of the microphone array 104 can have a low frequency sensitivity which is unmatched to low frequency sensitivities of the other microphones of the microphone array 104. For example, the particular microphone can have a low frequency sensitivity which is unmatched to low frequency sensitivities of the other microphones below about 600 Hz. In this example, the particular microphone can have a high frequency sensitivity which is matched to high frequency sensitivities of the other microphones above about 600 Hz.

The mechanical feature that causes the particular microphone to exhibit an acoustic-to-mechanical characteristic that differs from that of other microphones of the microphone array 104 can define an element of a high-pass mechanical filter of the particular microphone, wherein the high-pass mechanical filter (e.g., a first order high-pass filter) has a specified corner frequency. According to some configurations, the specified corner frequency is no higher than a frequency from about 500 Hz to about 700 Hz. In some configurations, the specified corner frequency is no higher than about 600 Hz.

Figure 2B:
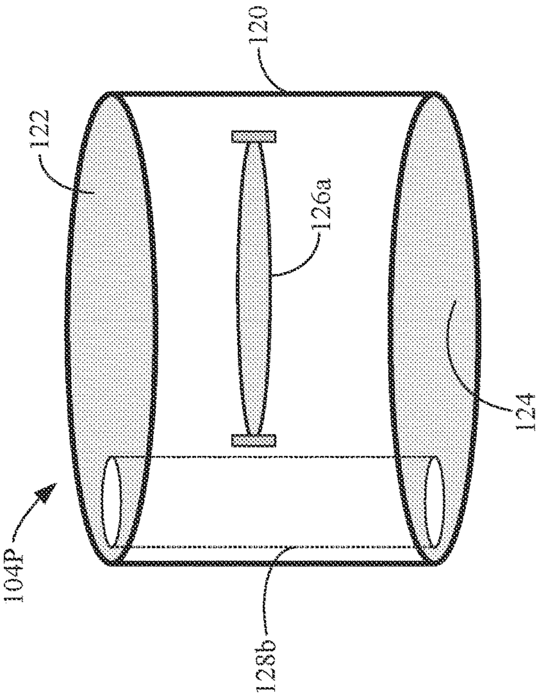
FIG. 2B is a generalized illustration of a particular microphone suitable for incorporation in any of the hearing devices disclosed herein, the particular microphone configured or arranged to exhibit an acoustic-to-mechanical characteristic that differs from that of other microphones of the hearing device in accordance with any of the embodiments disclosed herein.
Figure 2A:
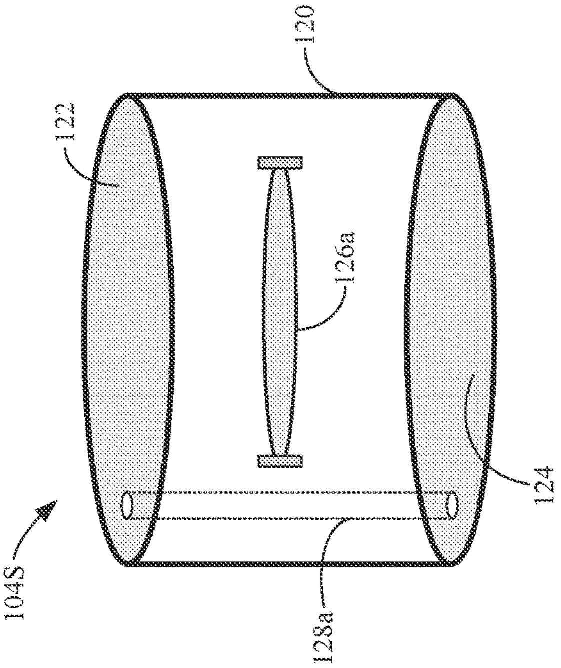
FIG. 2A is a generalized illustration of a standard microphone suitable for incorporation in any of the hearing devices disclosed herein.

FIG. 2A is a generalized illustration of a standard microphone 104S suitable for incorporation in any of the hearing devices disclosed herein. The standard microphone 104S includes an enclosure 120 having a first surface 122 and an opposing second surface 124. A diaphragm 126*a* is disposed between the first and second surfaces 122, 124. The standard microphone 104S includes a barometric relief vent 120*a* having a typical size (e.g., diameter) of about 1 to 4 μm.

FIG. 2B is a generalized illustration of a particular microphone 104P suitable for incorporation in any of the hearing devices disclosed herein. As was discussed previously, the particular microphone 104P includes a mechanical feature that causes the particular microphone 104P to exhibit an acoustic-to-mechanical characteristic that differs from that of other microphones (e.g., standard microphone 104S shown in FIG. 2A) of a microphone array 104. The particular microphone 104P includes an enclosure 120 having a first surface 122 and an opposing second surface 124. A diaphragm 126*b* is disposed between the first and second surfaces 122, 124. The particular microphone 104P includes a barometric relief vent 120*b* having a size (e.g., diameter) which is larger than the barometric relief vent 120*a* of the standard microphone 104S.

The larger-than-standard barometric relief vent 120*b* represents a mechanical feature of the particular microphone 104P the causes the particular microphone 104P to exhibit an acoustic-to-mechanical characteristic that differs from that of standard microphone 104S. The barometric relief vent 120*b* of the particular microphone 104P can range in size from about 6 to 100 μm (e.g., ~6-80 μm, ~6-60 μm, ~6-50 μm, ~6-40 μm, ~6-30 μm, ~6-20 μm, ~6-15 μm, ~6-10 μm, ~6-8 μm). Alternatively, or in addition, the mechanical feature of the particular microphone 104P can comprise a diaphragm 126*b* which differs from that of the other microphones of the microphone array 104. For example, the diaphragm 126*b* can differ from that of the other microphones in terms of one or more of size, thickness, and material.

According to some configurations, the particular microphone 104P can be the same type, technology, and/or overall physical size as the standard microphone 104S. In other configurations, the particular microphone 104P can differ from the standard microphone 104S in terms of type, technology, and/or overall physical size.

Figure 2C:
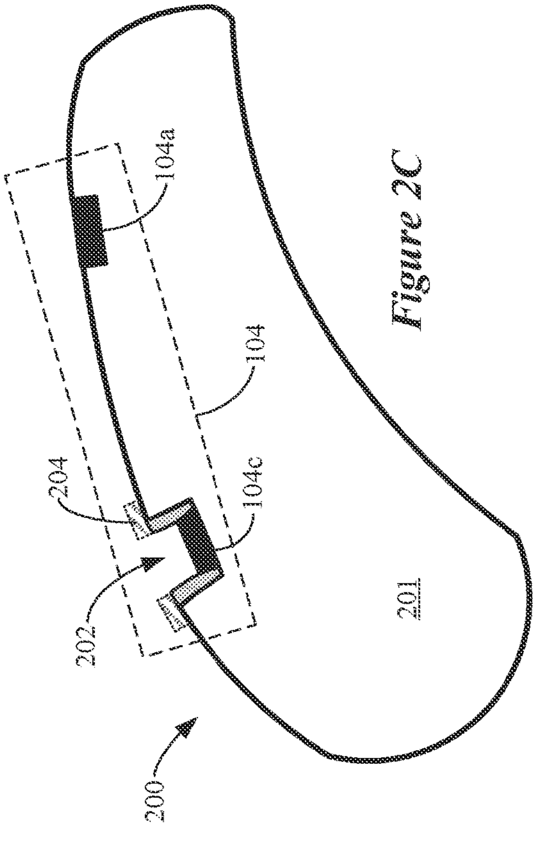
FIG. 2C is an illustration of a hearing device having a housing which includes a mechanical feature configured to cause a particular microphone of the hearing device to exhibit an acoustic-to-mechanical characteristic that differs from that of other microphones of the hearing device in accordance with any of the embodiments disclosed herein.

FIG. 2C is an illustration of a hearing device which includes a mechanical feature configured to cause a particular microphone of a microphone array to exhibit an acoustic-to-mechanical characteristic that differs from that of other microphones of the microphone array in accordance with any of the embodiments disclosed herein. The hearing device 200 shown in FIG. 2C is configured as a BTE-type device for purposes of illustration. It is understood that the hearing device 200 can be representative of any of the hearing device configurations disclosed herein (e.g., an ITE, CIC, or other in-ear or in-canal device; see, e.g., hearing device 100*d* shown in FIG. 1D).

The hearing device 200 includes a housing 201 comprising an acoustic port 202 configured to fluidically couple a particular microphone 104*c* to an acoustic environment external of the housing 201. The particular microphone 104*c* represents one of two or more microphones of a microphone array 104 of the hearing device 200. Although two microphones 104*a*, 104*c* are shown in FIG. 2C, the microphone array 104 of the hearing device 200 can include any number of microphones beyond the two shown in FIG. 2C (e.g., three microphones 104*a*, 104*b*, 104*c* shown in FIG. 1C). The particular microphone 104*c* is disposed proximate or in the acoustic port 202 so as to cause the particular microphone 104*c* to exhibit an acoustic-to-mechanical characteristic that differs from that of other microphones (e.g., microphone 104*a*) of the microphone array 104.

The acoustic port 202 includes a recessed section of the housing 201 configured to fluidically couple sound to the particular microphone 104*c* disposed at or near the bottom 202*a* of the acoustic port 202. The acoustic port 202 is configured to serve as a high-pass mechanical filter (e.g., a first order high-pass filter) for the particular microphone 104*c*. The physical properties (e.g., size, volume, shape, materials) of the acoustic port 202 can be selected to tune the frequency response of the high-pass mechanical filtering feature of the acoustic port 202. For example, the acoustic port 202 can be configured as a high-pass mechanical filter for the particular microphone 104*c* having a specified corner frequency. According to some configurations, the specified corner frequency is no higher than a frequency from about 500 Hz to about 700 Hz. In some configurations, the specified corner frequency is no higher than about 600 Hz. The acoustic port 202 can have a variety of shapes, and can include a curved cross-section, a polygonal cross-section or a combination of curved and polygonal cross-sections. For example, the acoustic port 202 can have any one or a combination of a round, oval, elliptical, arbitrary, square, rectangular, triangular, or other polygonal cross-sectional shape.

The acoustic port 202 provides for increased wind noise suppression by the particular microphone 104*c* relative to that achievable by the other microphones (e.g., microphone 104*a*) of the microphone array 104. The acoustic port 202 causes the particular microphone 104*c* to effectively exhibit a low frequency sensitivity which is unmatched to low frequency sensitivities of the other microphones (e.g., microphone 104*a*) of the microphone array 104, such that the mismatch in microphone sensitivity enhances audibility in the presence of wind noise. The acoustic port 202 is configured to modify the low frequency sensitivity of the particular microphone 104*c* below a specified corner frequency, while not (or only negligibly) impacting the high frequency sensitivity of the particular microphone 104*c* of the particular microphone 104*c*. As such, the particular microphone 104*c* can have a high frequency sensitivity which is matched to high frequency sensitivities of the other microphones above the specified corner frequency.

In some configurations, an exterior surface of the housing 201 proximate the acoustic port 202 can include a shroud structure 204 configured to enhance wind noise suppression of the hearing device 200. The shroud structure 204 typically surrounds the acoustic port 202 and is configured to divert wind away from the acoustic port 202 and the particular microphone 104*c*. In some configurations, a shroud structure 204 can by situated around other microphones (e.g., microphone 104*a*) of the hearing device 200.

The microphone array 104 of a hearing device (e.g., hearing device 200) which incorporates the acoustic port 202 shown in FIG. 2C can include a multiplicity of sensitivity matched microphones. As such, the particular microphone 104*c* of the hearing device 200 need not have a low frequency sensitivity which is unmatched to low frequency sensitivities of the other microphones (e.g., microphone 104*a*) of the microphone array 104. In some configurations, and to provide enhanced wind noise suppression beyond that achievable using the acoustic port 202 alone, the hearing device 200 can include the acoustic port 202 along with a particular microphone 104*c* configured in a manner described with reference to FIG. 2B (e.g., include a larger barometric relief vent 128*b*).

According to any of the embodiments disclosed herein, each of the microphones of the microphone array 104 can be configured as an omnidirectional microphone. In some configurations, at least the particular microphone is configured as an omnidirectional microphone. In some configurations, each of the microphones of the microphone array 104 can be configured as a directional microphone (e.g., a fixed or adaptive directional microphone). In other configurations, at least the particular microphone is configured as a directional microphone (e.g., a standard or adaptive directional microphone). In some configurations, each of the microphones of the microphone array 104 can be configured as a gradient/dipole microphone. In other configurations, at least the particular microphone is configured as a gradient/dipole microphone. It is noted that a pressure-gradient/dipole microphone is inherently directional, but one of the two microphones is less sensitive to low frequencies. It is understood that the microphone array 104 can include a combination of one or more omnidirectional microphones and one or more directional or gradient/dipole microphones.

A hearing device implemented in accordance with any of the embodiments disclosed herein can incorporate any one or any combination of the following microphone technology types: MEMS (micro-electromechanical system) microphones (e.g., capacitive, piezoelectric MEMS microphones), moving coil/dynamic microphones, condenser microphones, electret microphones, ribbon microphones, crystal/ceramic microphones (e.g., piezoelectric microphones), boundary microphones, PZM (pressure zone microphone) microphones, and carbon microphones.

The microphones of the microphone array 104 can use the same or different polar pattern. The polar pattern can be a fixed polar pattern or a directional/adjustable polar pattern. For example, the polar pattern of the microphones can be cardioid, supercardioid, hypercardioid, bi-directional (dipole), shotgun or lobar in nature. It is understood that the polar pattern and/or the directionality of the particular microphone and/or the other standard microphones of a microphone array 104 can be adjusted dynamically and automatically during operation of the hearing device 100 to enhance wind noise suppression and the wearer's listening experience. For example, one, some, or all of the microphones of the microphone array 104 can have variable directionality, allowing for real-time selection between omnidirectional and directional polar patterns (e.g., selecting between omni, cardioid, and shotgun patterns).

Figure 3:
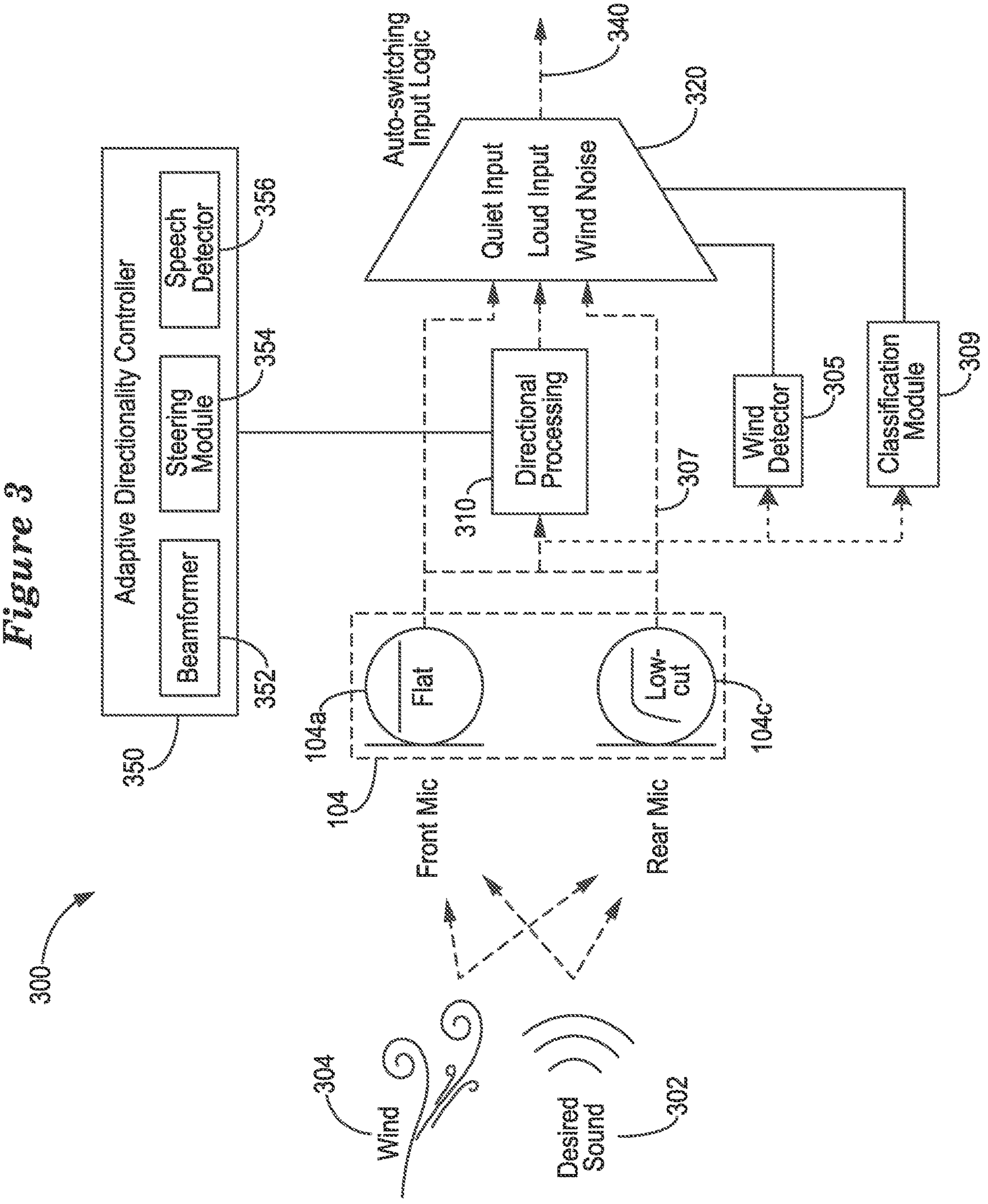
FIG. 3 illustrates electronic circuitry of a hearing device configured to automatically switch between different microphone operating modes including a wind noise suppression mode in accordance with any of the embodiments disclosed herein.

FIG. 3 illustrates electronic circuitry of a hearing device configured to automatically switch between different microphone operating modes including a wind noise suppression mode in accordance with any of the embodiments disclosed herein. The electronic circuitry 300 shown in FIG. 3 includes a microphone array 104 comprising a front microphone 104*a* and a rear microphone 104*c*. Although only two microphones 104*a*, 104*c* are included in the microphone array 104 shown in FIG. 3, it is understood that any number of microphones (e.g., 3, 4 or 5 microphones) can be incorporated in the microphone array 104. It is also understood that the term "front microphone" refers to a microphone of a hearing device which is predominantly directionally sensitive in the wearer's forward gazing direction. The term "rear microphone" refers to a microphone which is not a "front microphone," such as a microphone predominantly directionally sensitive in a direction oblique to the wearer's forward gazing direction (e.g., laterally directionally sensitive, rearwardly directionally sensitive).

In some configurations, the front and rear microphones 104*a*, 104*c* can be omnidirectional microphones. In other configurations, the front and rear microphones 104*a*, 104*c* can be directional microphones, such as gradient/dipole microphones. In further configurations, one of the front and rear microphones 104*a*, 104*c* can be an omnidirectional microphone, and the other of the front and rear microphones 104*a*, 104*c* can be a directional microphone.

The front and rear microphones 104*a*, 104*c* are operatively coupled to a directional processing circuit 310 and auto-switching input logic 320. The auto-switching input logic 320 is configured to automatically switch operation of the electronic circuitry 300 between different operating modes depending on the nature of the sound sensed by the front and rear microphones 104*a*, 104*c*. For example, the auto-switching input logic 320 can switch between a quiet mode, a loud mode, and a wind noise suppression mode in response to a quiet input, loud input, and wind noise input respectively received from the front and rear microphones 104*a*, 104*c*. The directional processing circuit 310 is configured to adjust the directional sensitivity of the front and rear microphones 104*a*, 104*c* in either of the quiet mode and the loud mode. However, the directional processing circuit 310 is bypassed via signal path 307 in response to detecting wind noise by a wind detector 305. An output 340 of the auto-switching input logic 320 is communicated to downstream electronics of the hearing device (e.g., audio signal processing circuity).

Typically, but not necessarily, the front microphone 104*a* has a flat frequency response, such that the front microphone 104*a* is equally sensitive to all frequencies over its operating range. The rear microphone 104*c* has a low frequency sensitivity which is unmatched to the low frequency sensitivity of the front microphone 104*a* (but is sensitivity matched at high frequencies relative to a specified corner frequency). This low-frequency sensitivity mismatch between the front and rear microphones 104*a*, 104*c* enhances audibility in the presence of wind noise.

In some configurations, and as previously discussed, the rear microphone 104*c* can include a mechanical element (e.g., a large barometric relief valve) that serves as a high-pass mechanical filter (e.g., a first order high-pass filter) having a specified corner frequency from about 500 Hz to about 700 Hz (e.g., no higher than about 600 Hz). In other configurations, and as previously discussed, the hearing device housing can include an acoustic port configured to fluidically couple sound to the rear microphone 104*c*. The acoustic port 202 is configured to serve as a high-pass mechanical filter (e.g., a first order high-pass filter) for the rear microphone 104*c* having a specified corner frequency from about 500 Hz to about 700 Hz (e.g., no higher than about 600 Hz).

As is depicted in FIG. 3, the front and rear microphones 104*a*, 104*c* are configured to sense a wide variety of sound in the wearer's acoustic environment including a desired sound 302 (e.g., a friend speaking, music playing) and wind noise 304. As previously discussed, wind noise 304 is mostly low in frequency, but can be so loud that it drowns out usable higher frequency signals. During operation of the hearing device within an acoustic environment, a classification module 309 is configured to classify the acoustic environment as at least one of a quiet environment with desired sound 302, a loud environment with desired sound 302, and an environment with desired sound 302 and wind noise 304. For example, the classification module 309 can be configured to classify sound sensed by the front and rear microphones 104*a*, 104*c* as one of music, speech, and non-speech within a quiet environment or a loud environment. The non-speech sound classified by the classification module 309 can include one or more of wind noise, machine noise, and other sounds. The classification module 309 can be implemented in accordance with the classification module embodiments disclosed in commonly owned U.S. Published Patent Application Serial No. 2011/0137656, which is incorporated herein by reference.

The wind detector 305, which can be integral to, or separate from, the classification module 309, can be configured to detect wind in accordance with specified detection rules and with reference to an upper threshold ($T_U$) and a lower threshold ($T_L$), each of which can be determined empirically. According to a representative wind detection methodology implemented by the wind detector 305, wind noise 304 is not detected if the front and rear omni microphone signal power is greater than the upper threshold, $T_U$, plus the directional microphone signal power. Wind noise 304 is detected if the front and rear omni microphone signal power is less than the lower threshold, $T_L$, plus the directional microphone signal power. Additional details of wind detection methodologies that can be implemented by the wind detector 305 are disclosed in commonly owned U.S. Published Patent Application Serial No. 2007/0219784, which is incorporated herein by reference.

In response to detecting a quiet acoustic environment with little or no wind noise 304, the electronic circuitry 300 is configured to operate in a quiet mode, with the front microphone 104*a* operating in a normal omnidirectional mode (e.g., normal omni operation in a quiet environment) and the rear microphone 104*b* is not used. The normal omnidirectional mode of operation is unaffected by the rear microphone 104*c* with reduced sensitivity to low frequencies, since this mode does not use the rear microphone 104*c*.

In response to detecting a loud acoustic environment with little or no wind noise 304, the electronic circuitry 300 is configured to operate in a loud mode, with the front and rear microphones 104*a*, 104*c* operating in a normal directional mode (e.g., normal directional operation in a loud environment). The normal directional mode of operation is unaffected by the rear microphone 104*c* with reduced sensitivity to low frequencies, since the front omnidirectional microphone signal is used for low frequencies, and the front and rear mic sensitivities are matched above the specified corner frequency (e.g., above 400 Hz, see other examples above). In response to detecting wind noise 304 by the wind detector 305, the electronic circuitry 300 is configured to operate in a wind noise suppression mode. When operating in the wind noise suppression mode, the rear microphone 104*c* operates in the omnidirectional mode, and the front microphone 104 is not used. Because the rear microphone 104*c* has reduced sensitivity to low frequencies relative to the front microphone 104*a*, superior wind noise suppression can be achieved relative to any currently-available noise suppression algorithm.

In accordance with any of the embodiments disclosed herein, the microphone array 104 shown in FIG. 3 can include more than two microphones. For example, the microphone array 104 can include a middle microphone, such as middle microphone 104*b* shown in FIG. 1C. According to some configurations, the front and rear microphones 104*a*, 104*c* can have a flat frequency response and the middle microphone 104*b* can be a microphone with reduced sensitivity to low frequencies of a type previously described. The automatic operating mode switching processes described above can be implemented by the electronic circuitry 300 using the front and rear microphones 104*a*, 104*c* having the flat frequency response and the middle microphone 104*b* having the reduced sensitivity to low frequencies.

In accordance with any of the embodiments disclosed herein, the microphone array 104 shown in FIG. 3 can include more than two microphones, at least two of which have reduced sensitivity to low frequencies. For example, at least two microphones of the microphone array 104 can be configured to provide different levels of wind noise suppression. For example, the front microphone 104*a* can have a flat frequency response, the middle microphone 104*b* can exhibit a first acoustic-to-mechanical characteristic that provides for a first level of wind noise suppression, and the rear microphone 104*c* can exhibit a second acoustic-to-mechanical characteristic that provides a second level of wind noise suppression different from the first level of wind noise suppression. For example, the level of wind noise suppression provided by the rear microphone 104*c* can be greater or less than the level of wind noise suppression provided by the middle microphone 104*b*. Moreover, the middle and rear microphones 104*b*, 104*c* can have the same or different wind noise suppression structures, such as those discussed hereinabove.

According to any of the embodiments disclosed herein, the directional processing circuit 310, when operating in a directional mode, can be configured to provide adaptive directionality by a beamformer which may be configured to provide off-axis speech detection and response. A beamformer implemented by the directional processing circuit 310 combines output signals produced by the front and rear microphones 104*a*, 104*c* to amplify sound signals from a target direction while attenuating sound signals from the other directions. Adaptive beamforming provides for determination of the target direction using output signals produced by the front and rear microphones 104*a*, 104*c*.

The directional processing circuit 310 can be configured to detect off-axis speech and steer the beamformer away from the detected off-axis speech, thereby reducing cancellation of the off-axis speech by the beamformer. The aim is to avoid the cancellation of the off-axis speech by the beamformer when the off-axis speech is detected.

The directional processing circuit 310 can include, or be coupled to, an adaptive directionality controller 350 configured to control a target direction of sound reception by the microphone array 104. The adaptive directionality controller 350 includes a beamformer 352 and a steering module 354. The adaptive directionality controller 350 can also include a speech detector 356, which may alternatively be a component of, or in input from, the classification module 309. The beamformer 352 is configured to cancel received sounds that are not from the target direction using known beamforming techniques. The speech detector 356 is configured to detect off-axis speech being speech that is not from the target direction. The steering module 352 is configured to steer the beamformer using known beamformer steering techniques in response to detection of the off-axis speech to reduce cancellation of the off-axis speech by the beamformer 352.

The adaptive directionality controller 350, beamformer 352, steering module 354, and speech detector 356 can be implemented in accordance with the embodiments disclosed in commonly owned U.S. Pat. No. 9,002,045, which is incorporated herein by reference.

Figure 4:
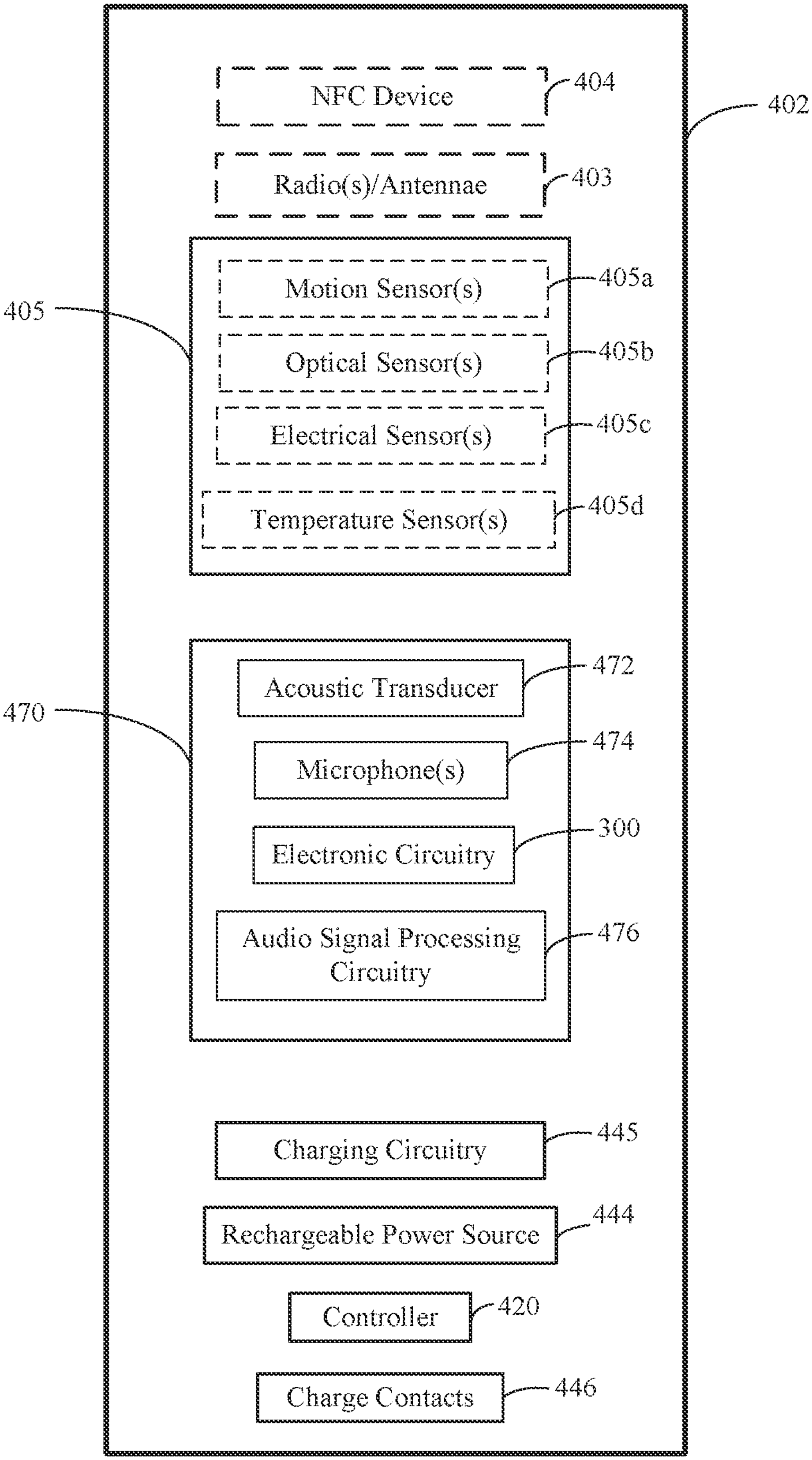
FIG. 4 is a block diagram of a representative ear-wearable electronic hearing device configured to provide for enhanced wind noise suppression in accordance with any of the embodiments disclosed herein.

FIG. 4 is a block diagram of a representative ear-wearable electronic device 402 configured to provide for enhanced wind noise suppression in accordance with any of the embodiments disclosed herein. The device 402 is representative of a wide variety of electronic devices configured to be deployed in, on or about an ear of a wearer. In addition to the electronic circuitry 300 previously described with reference to FIG. 3, the device 402 can include some or all of the components shown in FIG. 4. The device 402 can include an NFC device 404 of a type previously described, and may also include one or more RF radios/antennae 403 (e.g., compliant with a Bluetooth® or IEEE 802.11 protocol). The RF radios/antennae 403 can be configured to effect communications with an external electronic device, communication system, and/or the cloud. For example, data and control signals can be communicated between the device 402 and a smartphone, laptop, network server, and/or the cloud (e.g., a cloud server and/or processor) via one or more RF radios/antennae 403. The device 402 includes a controller 420, a rechargeable power source 444, charging circuitry 445, and charge contacts 446.

The device 402 can include one or more sensors 405, such as one or more of a motion sensor 405*a* (e.g., an IMU), one or more optical sensors 405*b* (e.g., a PPG sensor), one or more electrode-based sensors 405*c* (e.g., an ECG, EMG, EOG or EEG sensor), and/or one or more temperature sensors 405*d*.

In accordance with any of the embodiments disclosed herein, the device 402 can be configured as a hearing device or a hearable which includes an audio processing facility 470. The audio processing facility 470 includes audio signal processing circuitry 476 coupled to an acoustic transducer 472 (e.g., speaker, receiver, bone conduction device) and to a microphone array comprising one or more microphones 474.

The device 402 can be implemented as a hearing assistance device that can aid a person with impaired hearing. For example, the device 402 can be implemented as a monaural hearing aid or a pair of devices 402 can be implemented as a binaural hearing aid system, in which case left and right devices 402 are deployable with corresponding left and right wearable sensor units. The monaural device 402 or a pair of devices 402 can be configured to effect bi-directional communication (e.g., wireless communication) of data with an external source, such as a remote server via the Internet or other communication infrastructure. The device or devices 402 can be configured to receive streaming audio (e.g., digital audio data or files) from an electronic or digital source. Representative electronic/digital sources (e.g., accessory devices) include an assistive listening system, a streaming device (e.g., a TV streamer or audio streamer), a remote microphone, a radio, a smartphone, a laptop, a cell phone/entertainment device (CPED) or other electronic device that serves as a source of digital audio data, control and/or settings data or commands, and/or other types of data files.

The controller 420 shown in FIG. 4 (and the controller 110 shown in FIG. 1A) can include one or more processors or other logic devices. For example, the controller 420, 110 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein.

The controller 420, 110 can incorporate or be coupled to various analog components (e.g., analog front-end), ADC and DAC components, and Filters (e.g., FIR filter, Kalman filter). The controller 420, 110 can incorporate or be coupled to memory. The memory can include one or more types of memory, including ROM, RAM, SDRAM, NVRAM, EEPROM, and FLASH, for example.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure.

Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-wearable electronic hearing device comprising:

a housing configured to be worn on, in or about an ear of a wearer;

a power source disposed in the housing;

audio processing circuitry disposed in the housing and comprising a wind detector; and a microphone array disposed in or on the housing and operatively coupled to the audio processing circuitry, the microphone array comprising two omnidirectional microphones comprising:

a first microphone; and a second microphone having a frequency sensitivity matched to the first microphone above a first frequency and unmatched to the first microphone below a second frequency;

wherein the microphone array is configured to operate in a first mode in response to an absence of wind noise detected by the wind detector and operate in a second mode in response to presence of wind noise detected by the wind detector.

2. The device as in claim 1, wherein the first frequency is in a range from at least 600 Hz to no greater than 700 Hz.

3. The device as in claim 1, wherein the second frequency is in a range from at least 500 Hz to no greater than 600 Hz.

4. The device as in claim 1, wherein:

the first mode is a directional mode and the second mode is a wind suppression mode;

the microphone array is configured to operate in the directional mode using at least the first microphone and the second microphone and switch, in response to the wind detector detecting wind noise, from the directional mode to the wind noise suppression mode using the second microphone but not the first microphone.

5. The device as in claim 1, wherein the second microphone comprises a high-pass mechanical filter.

6. The device as in claim 5, wherein the high-pass mechanical filter comprises a barometric relief vent having a size which is larger than a barometric relief vent of the first microphone.

7. The device as in claim 6, wherein:

the barometric relief vent of the first microphone has a size of about 1 to 4 μm; and the barometric relief vent of the second microphone has a size larger than about 6 μm.

8. The device as in claim 1, wherein the second microphone comprises a diaphragm which differs from that of the first microphone in terms of one or more of size, thickness, and material.

9. The device as in claim 1, wherein:

the first microphone is a front microphone; and the second microphone is a rear microphone.

10. The device as in claim 1, wherein:

the first microphone is a front microphone;

the microphone array comprises a plurality of additional omnidirectional microphones including a rear microphone; and the second microphone is an additional omnidirectional microphone other than the rear microphone.

11. An ear-wearable electronic hearing device comprising:

a housing configured to be worn on, in or about an ear of a wearer;

a power source disposed in the housing;

audio processing circuitry disposed in the housing and comprising a wind detector; and a microphone array disposed in or on the housing and operatively coupled to the audio processing circuitry, the microphone array comprising two omnidirectional microphones comprising:

a front microphone; and a rear microphone having a frequency sensitivity matched to the front microphone above a first frequency and unmatched to the front microphone below a second frequency;

wherein the microphone array is configured to operate in a directional mode using the front microphone and the rear microphone, and switch, in response to the wind detector detecting wind noise, from the directional mode to a wind noise suppression mode using the rear microphone but not the front microphone.

12. The device as in claim 11, wherein the first frequency is in a range from at least 600 Hz to no greater than 700 Hz.

13. The device as in claim 11, wherein the second frequency is in a range from at least 500 Hz to no greater than 600 Hz.

14. The device as in claim 11, wherein the rear microphone comprises a high-pass mechanical filter.

15. The device as in claim 14, wherein the high-pass mechanical filter comprises a barometric relief vent having a size which is larger than a barometric relief vent of the front microphone.

16. The device as in claim 15, wherein:

the barometric relief vent of the front microphone has a size of about 1 to 4 μm; and the barometric relief vent of the rear microphone has a size larger than 6 μm.

17. The device as in claim 11, wherein the rear microphone comprises a diaphragm which differs from that of the front microphone in terms of one or more of size, thickness, and material.

18. The device as in claim 11, wherein the microphone array comprises a plurality of additional omnidirectional microphones disposed between the front microphone and the rear microphone.

19. An ear-wearable electronic hearing device comprising:

a housing configured to be worn on, in or about an ear of a wearer;

a power source disposed in the housing;

audio processing circuitry disposed in the housing; and a microphone array disposed in or on the housing and operatively coupled to the audio processing circuitry, the microphone array comprising two omnidirectional microphones comprising:

a first microphone; and a second microphone having a frequency sensitivity matched to the first microphone above a first frequency and unmatched to the first microphone below a second frequency;

wherein the first frequency is in a range from at least 600 Hz to no greater than 700 Hz, and the second frequency is in a range from at least 500 Hz to no greater than 600 Hz.

20. The device as in claim 19, wherein:

the audio processing circuitry comprises a wind detector; and the microphone array is configured to operate in a directional mode using at least the first microphone and the second microphone and switch, in response to the wind detector detecting wind noise, from the directional mode to a wind noise suppression mode using the second microphone but not the first microphone.

* * * * *